United States Patent

Ryan, Jr. et al.

[11] Patent Number: 5,881,133
[45] Date of Patent: Mar. 9, 1999

[54] METHOD FOR CORRECTING COMMUNICATIONS ERRORS WHEN COMMUNICATING WITH A VOICE RESPONSE UNIT OVER A CELLULAR TELEPHONE NETWORK

[75] Inventors: Frederick W. Ryan, Jr., Oxford; Frank M. D'Ippolito, Derby, both of Conn.

[73] Assignee: Pitney Bowes inc., Stamford, Conn.

[21] Appl. No.: 723,494

[22] Filed: Sep. 30, 1996

[51] Int. Cl.[6] .......................... H04M 1/64; H04M 11/00; H04M 1/00; H04Q 7/28
[52] U.S. Cl. ........................ 379/67.1; 379/76; 379/93.09; 379/93.28; 379/110.01; 455/403; 455/422; 455/550
[58] Field of Search .................................. 379/67, 88, 89, 379/93, 67.1, 76, 88.01, 88.18, 93.09, 93.28, 110.01; 455/422, 550, 403; 375/222; 371/375; 370/522

[56] References Cited

U.S. PATENT DOCUMENTS

| | | | |
|---|---|---|---|
| 4,802,218 | 1/1989 | Wright et al. | 380/23 |
| 4,887,265 | 12/1989 | Delix | 370/94.1 |
| 4,900,903 | 2/1990 | Wright et al. | 235/380 |
| 4,900,904 | 2/1990 | Wright et al. | 235/381 |
| 4,907,161 | 3/1990 | Samsone et al. | 364/464.02 |
| 4,931,943 | 6/1990 | Vermesse et al. | 364/464.02 |
| 5,142,534 | 8/1992 | Simpson et al. | 370/95.1 |
| 5,198,992 | 3/1993 | McCaslin | 364/724.09 |
| 5,243,654 | 9/1993 | Hunter et al. | 380/51 |
| 5,257,196 | 10/1993 | Sansone et al. | 364/464.02 |
| 5,280,268 | 1/1994 | Hunter et al. | 382/1 |
| 5,377,268 | 12/1994 | Hunter et al. | 380/23 |
| 5,533,019 | 7/1996 | Jayapalan | 370/60.1 |
| 5,544,222 | 8/1996 | Robinson et al. | 379/58 |
| 5,581,479 | 12/1996 | McLaughlin | 364/514 A |

OTHER PUBLICATIONS

Patent Application, Serial No. 08/577,683; assignee Pitney Bowes Inc.
Patent Application, Serial No. 08/575,782; assignee Pitney Bowes Inc.

*Primary Examiner*—Fan S. Tsang
*Assistant Examiner*—Allan Hoosain
*Attorney, Agent, or Firm*—Ronald Reichman; Melvin J. Scolnick; Robert Meyer

[57] ABSTRACT

This invention includes a voice response unit that communicates rapidly and directly with a system with minimum human intervention and minimizes the number of retransmissions of information due to errors. The rapid communication is achieved by knowing the question or prompt posed by the voice response unit and preparing a response which is speed dialed to the voice response unit. The voice response unit also examines an error correction code, i.e., Reed-Solomon, to determine if there is an error in the information transmitted to the voice response unit. The timing information enabled the voice response unit to determine whether or not one or more tones are missing from the transmitted information or one tone became two tones. The voice response unit determines if the information it received is correct based upon the error correction code. If, the information is incorrect the voice response unit uses the error correction code to determine and correct certain errors.

9 Claims, 4 Drawing Sheets

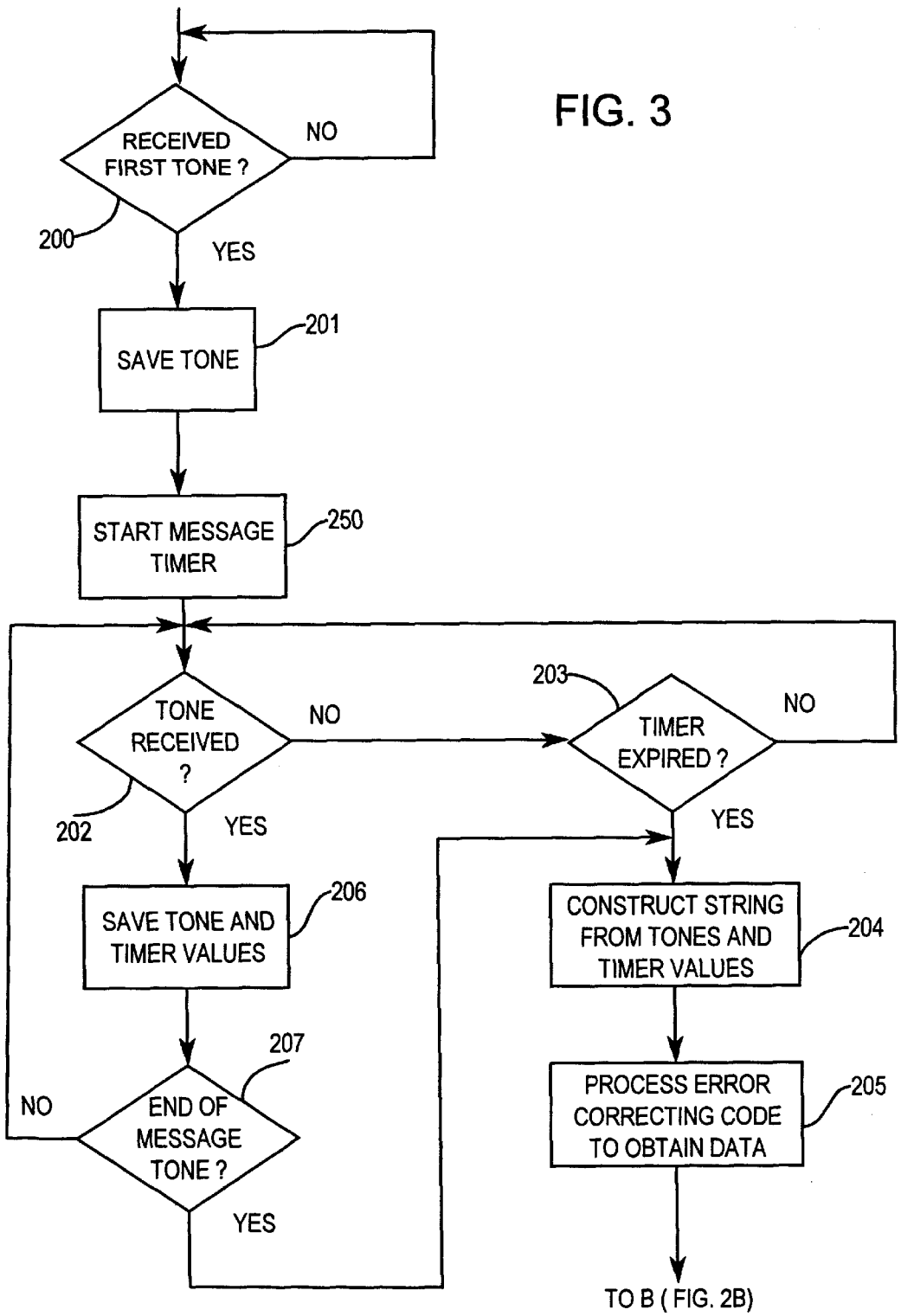

METHOD FOR CORRECTING COMMUNICATIONS ERRORS WHEN COMMUNICATING WITH A VOICE RESPONSE UNIT OVER A CELLULAR TELEPHONE NETWORK

FIELD OF THE INVENTION

The invention relates generally to the field of telecommunications systems and more particularly to error detection and correction of data systems which operate with voice response units that communicate directly with cellular telephones with minimum human intervention.

BACKGROUND OF THE INVENTION

Voice response units have been developed for generating an acoustic speech signal that communicates an intended message to permit a machine response to a human request for information. The units have been used to automate the process of entering or exchanging information with a system. Thus, voice response units permit natural interactions between a human and a system. The foregoing can be valuable for announcing warnings, reporting machine status or otherwise informing the system user, especially when the human can not view displays, due to concurrent visual tasks, visual handicap, or remote telephone link.

The cellular telephone user responded to the voice response units recorded message by pressing one or more buttons on the keypad of the users cellular telephone. The messages were transmitted to the voice response unit from the cellular telephone in the form of dual tone modulated frequency (DTMF) tones.

Often incorrect information is transmitted to voice response units and entered into the system (as valid data). The incorrect information may result from: incorrectly typed human input information; information that was not heard or understood by the human; or information that was not correctly understood by the voice response unit due to noise on the communications link.

The foregoing problem would be exacerbated by the distance between the cellular telephone and the voice response unit, interference on the cellular network and too many phone calls being made on the cellular network.

The voice response unit and the cellular telephone were also used to calculates a check sum to determine if there is an error in the information transmitted to the voice response unit. The check sum may be the total of the absolute value of the request code, account number, serial number, access code and amount desired to be added to the cellular phone divided by ten. If, the check sum calculated by the voice response unit is not divisible by ten, the voice response unit knew that the information it received was incorrect.

The check sum was used to enable the voice response unit to determine whether or not there was an error in the transmission of the DTMF tones. If, there was an error the voice response unit asked the cellular telephone user to reenter some or all of the previously transmitted information. The cellular telephone user would then at appropriate times press one or more buttons on the keypad of the cellular telephone. The foregoing took some time and was particularly annoying to impatient people. Errors were not also removed by retransmission of the questions and responses, since the same faulty transmission problems may still be present, i.e. the cellular transmission user is transmitting in a area that has a great deal of interference. Reed-Solomon error correction codes have been utilized to correct transmitted data.

The Reed-Solomon Code by itself was incapable of correcting errors introduced in the transmission of data to a VRU. For instance, if a four tone identification code was requested by the VRU and only a three digit identification code was received, the VRU would wait until the fourth tone was received. The fourth tone may never be received.

SUMMARY OF THE INVENTION

This invention overcomes the disadvantages of the prior art by providing a voice response unit that communicates rapidly and directly with a system with minimum human intervention and minimizes the number of retransmissions of information due to errors. The rapid communication is achieved by knowing the question or prompt posed by the voice response unit and preparing a response which is speed dialed to the voice response unit.

The voice response unit also examines an error correction code, i.e., Reed-Solomon, to determine if there is an error in the information transmitted to the voice response unit. Additional timing information enables the voice response unit to determine whether or not one or more tones are missing from the transmitted information or one tone became two tones. The voice response unit determines if the information it received is correct based upon the error correction code. If, the information is incorrect the voice response unit uses the error correction code to determine and correct certain errors.

The apparatus of this invention may be used in a cellular telephone payment metering system to enable the rapid, reliable interchange of information between a cellular telephone and a data center to enable funds to be added to the cellular telephone.

BRIEF DESCRIPTION OF THE DRAWING

FIG. 3 is a flow chart of the subroutine VRU receives data;

DETAILED DESCRIPTION OF THE PREFERRED EMBODIMENT

Figure 1:
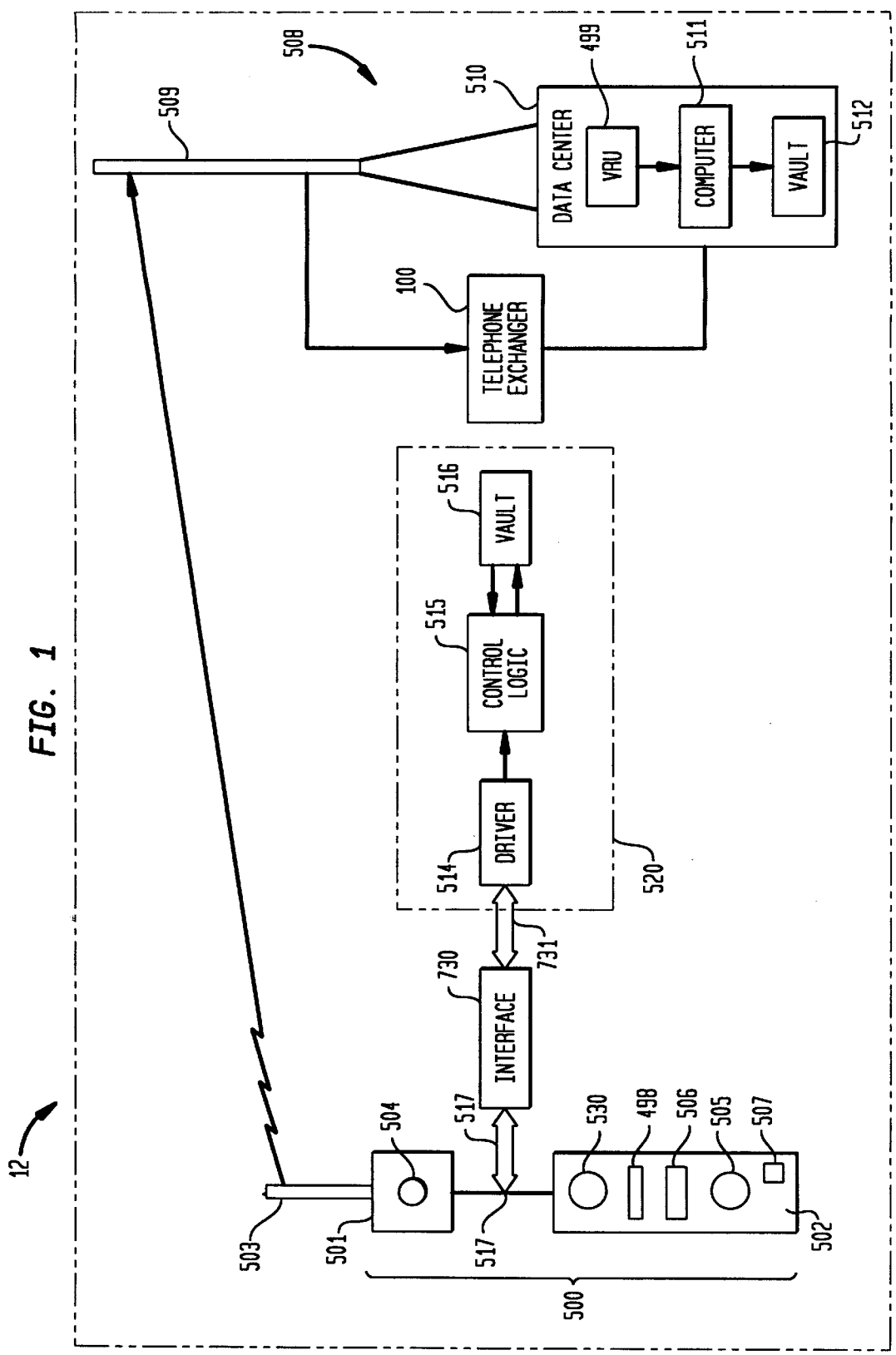
FIG. 1 is a drawing of the cellular telecommunications network of this invention.

Referring now to the drawings in detail and more particularly to FIG. 1, the reference character 12 represents the cellular telecommunications network of this invention. Network 12 includes: a cellular telephone 500, that has a radio portion 501 and a handset portion 502; a base station 508, that includes an antenna 509 and a data center 510 that includes a voice response unit 499, a computer 511 and a vault 512; and a telephone exchange 100. Radio 501 has an antenna 503 and speaker 504. Handset portion 502 has a mouthpiece 505, a keypad 506, a display 498, a speaker 530 and a power switch 507. Radio portion 501 is connected to handset portion 502 by a plurality of bi-directional wires 517. Wires 517 are connected to the input of interface 730 and wires 731 are coupled from the output of interface 730 to the input of driver 514. Interface 730 acts as a handshake to make the signals on wires 517 compatible with the signals processed by microprocessor 520. Driver 514 is coupled to control logic 515 and control logic 515 is connected to vault 516.

Driver 514 is a computer program that resides in microprocessor 520. Driver 514 decodes the information that is entered into handset portion 502 via keypad 506 and transforms the entered information into a 16 bit command word. It would be obvious to one skilled in the art that different numbers of bits may be used for the command word depending upon the amount of information that is being conveyed. The operation of driver 514 is more fully described in the description of U.S. patent application Ser. No. 08/575,782 entitled "Metered Payment Cellular Telephone Communication System", filed Dec. 22, 1995, herein incorporated by reference.

Control logic 515 is a computer program that resides in microprocessor 520. Logic 515 takes action on the items it monitors and controls the management of funds entered into vault 516. Control logic 515 uses the information provided by driver 514 for call and vault management. Call management pertains to: deciding what telephone numbers are dialed; preventing the completion of telephone calls when there is not sufficient funds in vault 516; and the allowing of certain "free" emergency calls. Vault management refers to: decrementing vault 516 on a time and rate basics during a telephone call; initiating an algorithm contained in voice response unit (VRU) 499 during the vault refill process; and displaying the remaining funds contained in vault 516. The operation of control logic 515 are more fully described in the description of U.S. patent application Ser. No. 08/575,782 entitled "Metered Payment Cellular Telephone Communication System", filed Dec. 22, 1995, herein incorporated by reference.

A plurality of recorded messages are stored in VRU 499. Computer 511 determines which recorded message would be transmitted to the caller that is using cellular telephone 500. The cellular telephone caller responds to the recorded message by pressing one or more of the buttons on keypad 506. The messages are transmitted to VRU 499 from cellular telephone 500 in the form of dual tone modulated frequency (DTMF) tones. The DTMF tone corresponding to a # button on keypad 506 is used by the cellular telephone caller to signify the end of a message. VRU 499 converts the DTMF tones into numbers that computer 511 can read and then transmits these numbers to computer 511. Computer 511 will then inform VRU 499 the appropriated recorded message or response. The interaction of computer 511 with VRU 499 will be more fully described in the description of FIGS. 2A and 2B.

Vaults 512 and 516 contain registers and information needed to track the use of cellular telephone 500. Vaults 512 and 516 contain: ascending registers; descending registers; a control sum (which is the sum of the ascending and descending registers); and encryption logic (which is in the form of a program code). Vault 516 uses seeds that are embedded into vault 516 at the time of the vaults manufacture. The seeds in vault 516 are in plain text. Vault 512 uses seeds that are encoded and are decoded in vault 512 prior to the seeds being used for encryption. The new seeds generated by vault 512 must then be encrypted before they are returned to computer 511. The aforementioned seeds are used to insure that the information contained in vault 512 matches the information contained in vault 516. The currently used seed will also be used to generate new seeds for vaults 512 and 516 for the next refill. The operation of vaults 512 and 516 are more fully described in the description of copending U.S. patent application Ser. No. 08/575,782 entitled "Metered Payment Cellular Telephone Communication System", filed Dec. 22, 1995, herein incorporated by reference.

When someone would want to place a telephone call on telecommunications network 12, they would activate power switch 507 and enter the telephone number they wish to call on keypad 506. Driver 514 and control logic 515 will process the call and cellular telephone 500 will transmit a signal via antenna 503. The aforementioned signal is received by antenna 509 and connected to telephone exchange 100.

Figure 2A:
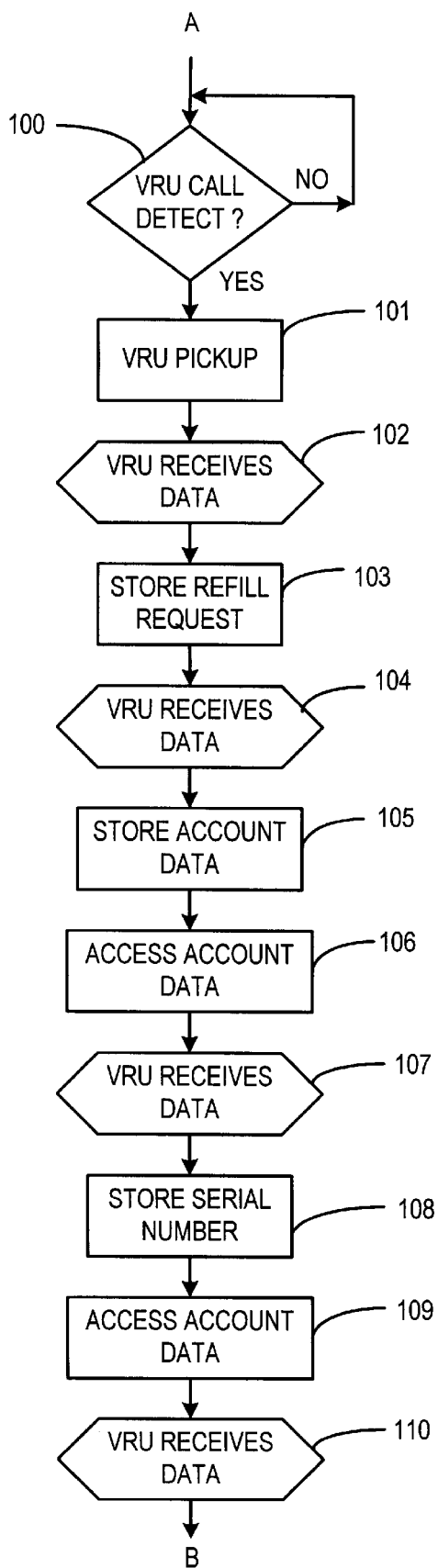
FIGS. 2A and 2B are a flow chart of the interaction of computer 511 with voice response unit 499.
Figure 2B:
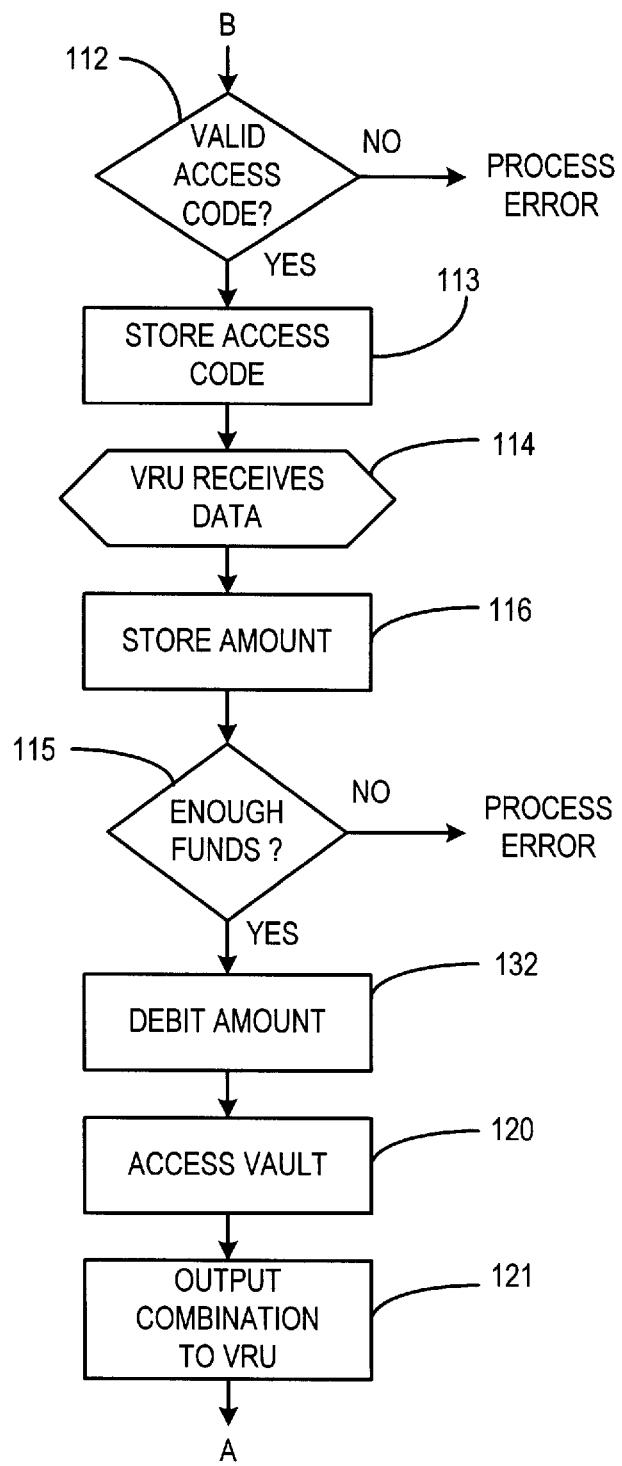

FIGS. 2A and 2B are a flow chart illustrating the interaction of computer 511 with voice response unit 499. The program begins at VRU call detect block 100. If, no data is being transmitted from cellular telephone 500 by the depressing of one or more buttons on keypad 506, the program would remain in block 100 waiting for a call. If, a call occurs, the program would proceed to VRU pickup block 701, where VRU 499 would answer the call being transmitted by cellular telephone 500. VRU 499 would also output a welcome message together with a prompt to the caller. The prompt may ask the caller to press one or more buttons on keypad 506, to enter a code and/or to press one or more buttons on keypad 506 to continue. Then, cellular telephone 500 will automatically begin sending information as expected to VRU 499.

The program now proceeds to the VRU receives data subroutine block 102. If, data is not available from cellular telephone 500, the program will wait in block 102. After completing the subroutine in block 102 the program would proceed to store the refill request in block 103. After storing the refill request the program would proceed to block 104 VRU receives data subroutine. The program would now complete the subroutine described in the description of FIG. 3 before going to access the account data in block 106. After accessing and storing the account data the program would go to block 107 VRU receives data subroutine. The program would now complete the subroutine described in the description of FIG. 3 before going to block 108 to store the serial number.

After, storing the serial number, the program advances to access account data block 109. In block 109 computer 511 obtains information regarding the use of cellular telephone 500. Then, the program would proceed to VRU receives data subroutine (FIG. 3).

After, completing the subroutine described in FIG. 3, then the program would go to store access code block 113, where the access code would be stored for future use. Then, the program would go to the VRU receives data subroutine (FIG. 3). At this point, the program would go to store amount block 116, where the amount previously entered in block 610 of FIG. 3D of U.S. patent application Ser. No. 08/575, 782 entitled "Metered Payment Cellular Telephone Communication System", filed Dec. 22, 1995, herein incorporated by reference, will be transmitted to VRU 499 and computer 511.

After, the amount has been stored the program advances to enough funds block 115, where computer 511 checks to determine if there is sufficient credit or funds available to debit the entered amount against the account. If, sufficient funds are available, the program proceeds to debit amount block 132, where the amount debited is stored. Then, the program goes to access vault block 120, where the program gives the hidden seed, the amount, the access code and the control sum to vault 512 and receives a new hidden seed, a new control sum and the combination. Now, the program goes to block 121 and outputs the combination to VRU 499.

If, a valid refill request was not received in block 103, or a valid account number was not received in block 105 or a valid serial number was not received in block 108, or a valid access code was not received in block 112, or not enough funds were available in block 115, then the program would advance to error block 111. In block 111, computer 511 would instruct VRU 499 to transmit a message to cellular telephone 500 informing the caller of cellular telephone 500 that a problem exists i.e., improper phone serial number, improper account number, invalid refill request, etc. It is possible at any point in the above program for the caller to hang up and try refilling cellular telephone 500 at a different time. Now, the program would go to block 100 in FIG. 2A.

FIG. 3 is a flow chart of the subroutine VRU receives data. The subroutine begins in decision block 200 entitled received first tone. If, VRU 499 (FIG. 1) has not received the first tone, then and in that event the program waits until the first tone is received. If, the first tone is received then the program goes to block 201 to save the tone in memory. Now the program goes to block 250 to start the message timer. The message timer times the message. The expected time or duration of each message is equal to the number of expected tones plus one times the expected time per tone. The program proceeds to decision block 202 to determine if the tone was received. If, the tone was not received, the program goes to decision block 203 timer expired. If, the timer has not expired, the program goes back to decision block 202 and waits for the next tone. If, the timer has expired, then the program goes to block 204 to construct a data string from the tones and timer values. Based upon the timer values it can be determined if a tone was skipped (not received) or was received twice by the VRU. If a tone was skipped a random tone may be inserted in its place. The error correction will ensure that the proper data is used for later processing. If, a tone has been received twice, one of the duplicate tones may be discarded. Now the program would go to block 205 to process the error correction code to obtain new data. After obtaining the new data the program would proceed back to FIGS. 2A and 2B at the point it left the program.

If, decision block 202 received a tone the program would go to block 206 to save the tone and timer values. At this point the program would go to decision block 207 to determine whether or not an end of message tone was received. If, an end of message tone was not received the program would go back to decision block 202. If, an end of message tone was received the program would go to block 204 to construct a data string from the tone and timer values, and to block 205 to process the error correcting code to obtain data. One type of error correcting code is that may be utilized is a Reed-Solomon code. A Reed-Solomon code is used to add redundancy to the transmitted data in order to make the communication system less prone to errors. The theory of Reed-Solomon coding is more fully described in Chapter 4(pages 57–69) of Algebraic Methods For Processing And Communications Coding by Richard E. Blahut, Published in 1992, by Springer-Verlag New York, Inc. herein incorporated by reference.

The data string would consist of the data and error correction codes.

The following chart is an illustration of a Reed-Solomon error correction code that is used in conjunction with time values.

| Code Word | Data | Extra Digits |
| --- | --- | --- |
| 1 | 0 | 00 |
| 2 | 1 | 11 |
| 3 | 2 | 22 |
| 4 | 3 | 33 |

Two extra digits are added on the end of each number so that each code word will have three digits. The extra digits are added in a manner that each code word will differ from other code words in at least three locations. Thus, if one digit location has an improper value, that code word can be examined to determine the code word that it probably is. It will be obvious to one skilled in the art that additional code words may be created by adding additional digits to each code word.

In example below a field of eight has been selected. Therefore, only tones 0 through 7 may be used. A (7,5) Reed-Solomon code has been chosen. Therefore, each code word will be seven tones long. By applying Reed-Solomon, one error will be able to be corrected for each code word. The tones 4,6,1,2,2,1 and # will be transmitted by cellular telephone 500 (FIG. 1). data center 510 receives the above tones at the times indicated in the chart below.

| Time | Tone |
| --- | --- |
| 0 | 4 |
| 1 | 6 |
| 2 | No Tone |
| 3 | 1 |
| 4 | 2 |
| 5 | 2 |
| 6 | 1 |
| 7 | # |

Based upon the tones received and the time the tones were received it can be determined that the tone expected at time 2 was skipped. Reed-Solomon can then be applied to a code word formed by the tones 4,6, no tone, 1,2,2, and 1, where any value "X" may be substituted for the location where no tone was received.

| | Data | Error Correction Code | Stop Character |
| --- | --- | --- | --- |
| Transmitted Tones | 4,6,3,1,2 | 21 | # |
| Received Tones | 4,6,X,1,2 | 21 | # |
| Data After Error Correction | 4,6,3,1,2 | 21 | |

After applying Reed-Solomon, the original data and error correction tones can be recaptured, i.e., 4,3,1,2,2, and 1. It should be noted that Reed-Solomon will work equally well if errors or skips occur in either the data or error correction tones.

The above specification describes a new and improved telecommunications systems that that transmits data and an error correction code to a voice response unit that processes the error correction code and data to determine the actual data transmitted by the telephone. It is realized that the above description may indicate to those skilled in the art additional ways in which the principles of this invention may be used without departing from the spirit. It is, therefore, intended that this invention be limited only by the scope of the appended claims.

What is claimed is:

1. A communications system for sending data in a predetermined format over a telephone network, said system comprising:

a telephone that transmits data;

means located in said telephone for generating an error correction code that is related to the data entered into said telephone;

means located in said telephone for transmitting the data entered into said telephone and the error correction code generated by said telephone;

a voice response unit containing a plurality of prerecorded prompts or questions and a timer unit to determine if the transmitted data is duplicate data or missing data; and means located in said voice response unit for processing the telephone data and error correction codes to determine the actual data transmitted by said telephone.

2. The system claimed in claim 1, wherein said telephone transmits data in predetermined intervals.

3. The system claimed in claim 1, wherein said telephone transmits data in the form of tones.

4. The system claimed in claim 1, wherein said telephone transmits an error correction code in predetermined intervals.

5. The system claimed in claim 1, wherein said telephone transmits an error correction code in the form of tones.

6. The system claimed in claim 3, wherein the tones are DTMF tones.

7. The system claimed in claim 5, wherein the tones are DTMF tones.

8. The system claimed in claim 1, wherein the error correction code is a Reed-Solomon error correction code.

9. The system claimed in claim 1, wherein said telephone is a cellular telephone.

* * * * *